(12) United States Patent
Shimada et al.

(10) Patent No.: US 6,725,672 B2
(45) Date of Patent: Apr. 27, 2004

(54) HYDROGEN STORAGE APPARATUS

(75) Inventors: Toshiaki Shimada, Saitama (JP); Takahiro Kuriiwa, Saitama (JP); Yoshio Nuiya, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 8 days.

(21) Appl. No.: 10/267,187

(22) Filed: Oct. 9, 2002

(65) Prior Publication Data

US 2003/0070434 A1 Apr. 17, 2003

(30) Foreign Application Priority Data

Oct. 11, 2001 (JP) ........................................ 2001-313378

(51) Int. Cl.[7] ................................................ F17C 9/02
(52) U.S. Cl. ........................................................ 62/48.1
(58) Field of Search ................................ 62/45.1, 46.1, 62/48.1; 137/14, 255, 256, 265, 266

(56) References Cited

U.S. PATENT DOCUMENTS 4,343,770 A * 8/1982 Simons ........................ 422/112
5,916,245 A * 6/1999 Tom ............................ 62/46.1

* cited by examiner

Primary Examiner—Denise L. Esquivel
Assistant Examiner—Malik N. Drake
(74) Attorney, Agent, or Firm—Lahive & Cockfield, LLP; Anthony A. Laurentano, Esq.

(57) ABSTRACT

A hydrogen storage apparatus M stores a liquid hydrogen tank 1, hydrogen filling passage 3 that fills liquid hydrogen in to the liquid hydrogen tank, a degassing passage 4 provided with a relief valve V1 that opens when the pressure of hydrogen gasified in the liquid hydrogen tank reaches a predetermined level, and a hydrogen occlusive tank 2 that accommodates a hydrogen occlusive alloy 21 for storing the gasified hydrogen. When liquid hydrogen is being filled into the liquid hydrogen tank 1, the pressure in the hydrogen occlusive tank 2 is lowered using a duct 51, a cooling fan 52, and a conduit 54 for cooling the hydrogen occlusive tank 2. Accordingly, the filling time is shortened and the fuel efficiency is improved.

6 Claims, 5 Drawing Sheets

HYDROGEN STORAGE APPARATUS

BACKGROUND OF THE INVENTION

This invention relates to a hydrogen storage apparatus for use with a vehicle that utilizes hydrogen as a fuel (hereinafter referred to as "hydrogen-fueled vehicle").

In recent years, a tank for storing liquid hydrogen as a fuel is used as a hydrogen storage apparatus for a hydrogen-fueled vehicle. In the hydrogen-fueled vehicle including such a tank, the liquid hydrogen filled into the tank is gasified, and thus increases pressure in the tank, which makes it difficult to fill liquid hydrogen into the tank, disadvantageously making the hydrogen-filling operation a time-consuming task. Therefore, the gasified hydrogen (hereinafter referred to as boil-off gas or "BOG") is usually degassed out of the vehicle, as appropriate, so as not to keep the pressure in the tank from increasing beyond a predetermined level.

However, such a conventionally adopted process of degassing BOG out of the vehicle in turn causes the fuel efficiency to decline by the amount of BOG degassed. Conversely, in order to keep the fuel efficiency from declining, the BOG degassed out of the vehicle should be restricted to the minimum, and restriction of the degassed BOG would disadvantageously prolong the time required to fill hydrogen.

SUMMARY OF THE INVENTION

Therefore, it is an exemplified general object of the present invention to provide a hydrogen storage apparatus and method of filling hydrogen into the hydrogen storage apparatus capable of shortening the filling time as well as enhancing the fuel efficiency.

According to one exemplified aspect of the present invention, there is provided a hydrogen storage apparatus including a liquid hydrogen tank, a hydrogen filling passage, a degassing passage, a hydrogen occlusive tank, and a cooling device. The liquid hydrogen tank is installed in a hydrogen-fueled vehicle driven by a hydrogen-using device. The hydrogen filling passage fills liquid hydrogen into the liquid hydrogen tank. The degassing passage is provided with a release valve that opens when pressure of hydrogen gasified in the liquid hydrogen tank reaches a predetermined actuating pressure. The hydrogen occlusive tank accommodates a hydrogen occlusive alloy for storing the gasified hydrogen. The pressure in the hydrogen occlusive tank when liquid hydrogen is being filled into the liquid hydrogen tank is lowered using the cooling device that cools the hydrogen occlusive tank.

When the liquid hydrogen is being filled into the liquid hydrogen tank, the cooling device cools the hydrogen occlusive tank, and thereby the pressure in the hydrogen occlusive tank decreases. When the pressure in the liquid hydrogen tank reaches the predetermined actuating pressure, the release valve opens and hydrogen gasified in the liquid hydrogen tank is flown into the hydrogen occlusive tank. Hydrogen, thus flown into the hydrogen occlusive tank, is occluded in the cooled hydrogen occlusive alloy. The actuating pressure may be an absolute pressure in the liquid hydrogen tank, and may also be a differential pressure between internal pressures in the liquid hydrogen tank and in the hydrogen occlusive tank.

According to another exemplified aspect of the present invention, the above cooling device in the hydrogen storage apparatus cools the hydrogen occlusive tank utilizing the liquid hydrogen that is being filled.

The temperature of the liquid hydrogen lower than the boiling point of principal components of air, nitrogen and oxygen, may for example cool air surrounding the hydrogen filling passage through which the liquid hydrogen passes, changing the air into the liquid state. The resultant liquid air is mixed with air and blown to the hydrogen occlusive tank using a blower such as a fan.

According to yet another exemplified aspect of the present invention, the above hydrogen storage apparatus further includes a bypass that is provided in the degassing passage so as to detour round the release valve, and a switching device that alternatively switches a route of the gasified hydrogen between the degassing passage and the bypass. The switching device switches the route to allow hydrogen gasified in the liquid hydrogen tank to pass through the bypass when liquid hydrogen is being filled into the liquid hydrogen tank.

When the liquid hydrogen is being filled into the liquid hydrogen tank, the switching device may be switched so as to allow hydrogen gasified in the liquid hydrogen tank to pass through the bypass, so that the hydrogen may bypass the release valve and be fed into the hydrogen occlusive tank.

According to yet another exemplified aspect of the present invention, the above hydrogen occlusive tank is connected to the hydrogen-using device, so that hydrogen in the hydrogen occlusive tank is used prior to hydrogen in the liquid hydrogen tank when the hydrogen-using device is driven.

Under conditions where the hydrogen occlusive tank may generate hydrogen and supply the same to the hydrogen-using device when the hydrogen-using device is driven, hydrogen is supplied from the hydrogen occlusive tank by priority.

According to yet another exemplified aspect of the present invention, there is provided a method of filling hydrogen into a hydrogen storage apparatus installed in a hydrogen-fueled vehicle driven by a hydrogen-using device, which hydrogen storage apparatus includes a liquid hydrogen tank and a hydrogen occlusive tank. The method comprises the steps of filling liquid hydrogen into the liquid hydrogen tank, and enabling the hydrogen occlusive tank to occlude hydrogen gasified in the liquid hydrogen tank, to reduce pressure in the liquid hydrogen tank. This method, which includes the step for reducing pressure in the liquid hydrogen tank, thus serves to accelerate the operation of filling liquid hydrogen into the liquid hydrogen tank, and shortens the filling time. Moreover, no BOG is degassed out by this method, and thus fuel efficiency is improved.

The above method may further include the step of cooling the hydrogen occlusive tank. Cooling the hydrogen occlusive tank contributes to secure reduction of the pressure in the liquid hydrogen tank.

Other objects and further features of the present invention will become readily apparent from the following description of preferred embodiments with reference to accompanying drawings.

DETAILED DESCRIPTION OF THE PREFERRED EMBODIMENTS

A description will now be given in detail of a hydrogen storage apparatus according to the present invention with reference to the drawings. The present invention is applied as one exemplified embodiment to a fuel cell vehicle (hydrogen-fueled vehicle) A that is driven using a fuel cell (hydrogen-using device) FC as shown in FIG. 1.

Figure 1:
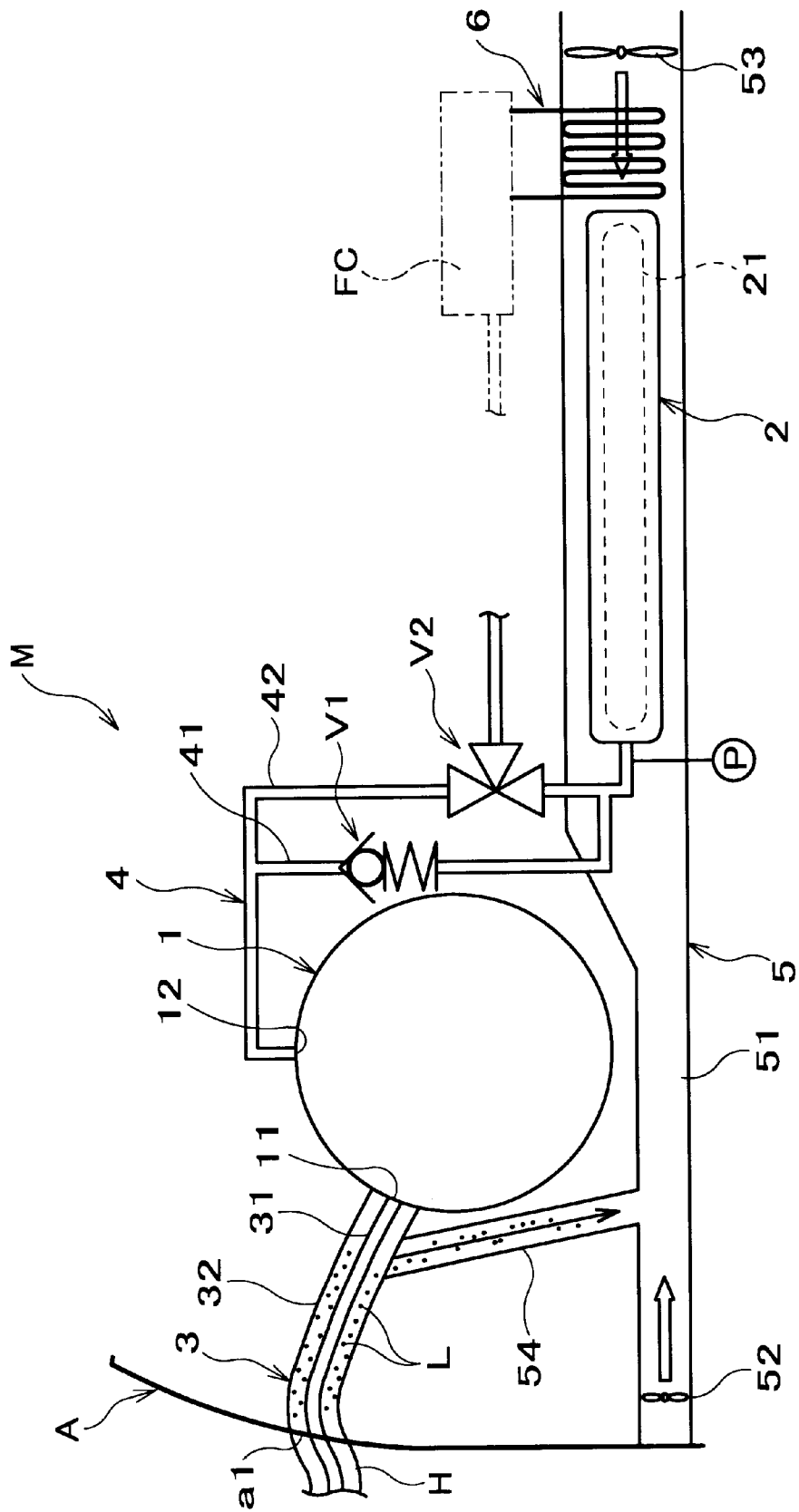
FIG. 1 is a schematic diagram of one exemplified embodiment of a hydrogen storage apparatus according to the present invention.

The hydrogen storage apparatus M as shown in FIG. 1 includes two tanks for storing hydrogen: one is a liquid hydrogen tank 1; the other is a hydrogen occlusive tank 2. The hydrogen storage apparatus M also includes a hydrogen filling passage 3 for filling liquid hydrogen into the liquid hydrogen tank 1, an degassing passage 4 for evacuating hydrogen gasified in the liquid hydrogen tank 1 (hereinafter referred to as "BOG"), and a temperature controller 5 for controlling temperature in the hydrogen occlusive tank 2.

The liquid hydrogen tank 1 can store a predetermined weight of liquid hydrogen. A filling port 11 for filling liquid hydrogen and a BOG vent 12 for evacuating BOG are each formed at an adequate position in the liquid hydrogen tank 1.

The hydrogen occlusive tank 2 is filled with an $AB_5$ hydrogen occlusive alloy 21 in an amount equivalent to the amount of BOG generated in the liquid hydrogen tank 1 so that the hydrogen occlusive tank 2 can store hydrogen of approximately one twentieth in weight of that which is storable in the liquid hydrogen tank 1. Since the amount of BOG generated in the liquid hydrogen tank 1 is approximately five percent of capacity of the whole amount of the liquid hydrogen filled, thus-provided hydrogen occlusive tank 2 may sufficiently collect the BOG generated in the liquid hydrogen tank 1.

Figure 2:
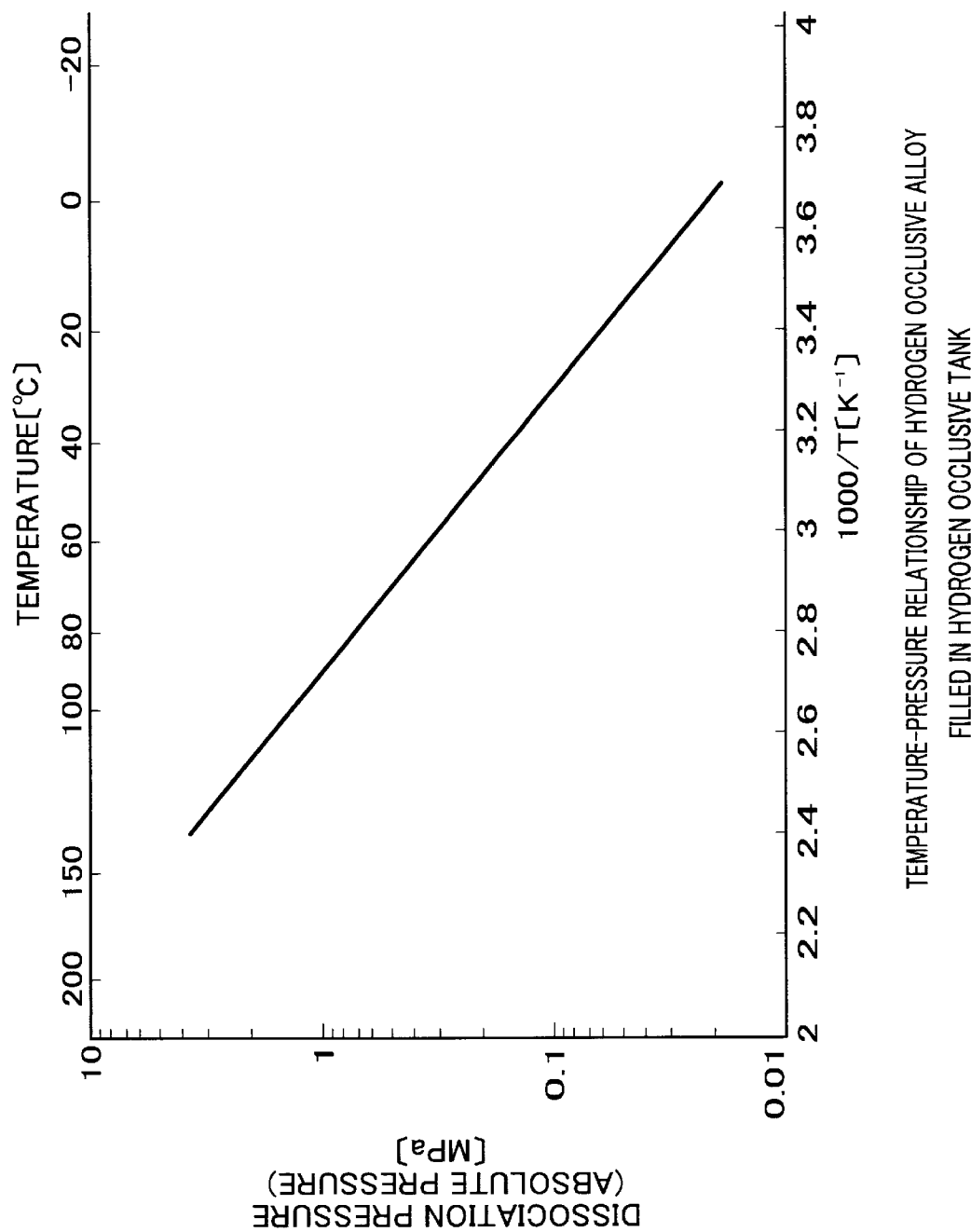
FIG. 2 is a temperature-pressure chart showing the characteristic of hydrogen occlusive alloys used in a preferred embodiment of the present invention.

The hydrogen occlusive alloy 21 has the temperature-pressure characteristic as shown in FIG. 2. As shown in the graph, the hydrogen occlusion/emission equilibrium pressure (dissociation pressure) of the hydrogen occlusive alloy 21 varies with temperature, and thus control over the occlusion and emission of hydrogen may be achieved by controlling the temperature of the hydrogen occlusive alloy 21.

The hydrogen filling passage 3 is principally comprised of a liquid hydrogen pipe 31 and a pipe cover 32 enclosing the liquid hydrogen pipe 31. One end of the hydrogen filling passage 3 is connected with a vehicular filling port a1 provided in the fuel cell vehicle A, while the other end thereof is connected with the filling port 11 of the liquid hydrogen tank 1. The pipe cover 32 is made of a heat-insulating material, and serves to prevent penetration of heat when hydrogen is filled.

One end of the degassing passage 4 is connected with the BOG vent 12 of the liquid hydrogen tank 1, while the other end thereof is connected with the hydrogen occlusive tank 2.

The degassing passage 4 diverges into a first passage (vent) 41 and a second passage (bypass) 42 at a midpoint thereof, and the first passage 41 is provided with a relief valve (release valve) V1. The second passage 42 that is arranged to detour round the relief valve V1 is provided with a three-way solenoid valve (switching device) V2 between points where the second passage 42 branches off from the first passage 41 and where the second passage 42 meets with the first passage 41.

The relief valve V1 is configured to open when the pressure of BOG within the liquid hydrogen tank 1 reaches approximately 500 kPa.

The three-way solenoid valve V2 includes three valve arrangements, among which two solenoid valve arrangements connected with the second passage 42 are configured to open and close simultaneously, while the other solenoid valve arrangement connected with a fuel cell is kept closed. Accordingly, the three-way solenoid valve V2 may alternatively switches a route of BOG between the first passage 41 and the second passage 42. In addition, the three-way solenoid valve V2 may arbitrarily switch routes through which BOG flows by closing one of the three solenoid valve arrangements. Through the three-way solenoid valve V2 and pipes of various kinds, the liquid hydrogen tank 1 and the hydrogen occlusive tank 2 are connected with the fuel cell FC.

The temperature controller 5 is principally comprised of a duct 51 extending from somewhere near the liquid hydrogen tank 1 toward the hydrogen occlusive tank 2, a cooling fan 52 provided within the duct 51 at a location near the liquid hydrogen tank 1, and a heating fan 53 provided within the duct 51 at a location near the hydrogen occlusive tank 2.

Provided at an appropriate location on the duct 51 near the liquid hydrogen tank 1 and coupled with the duct 51 is a conduit 54 for introducing liquid air L generated around the hydrogen filling passage 3 into the duct 51. Within the duct 51, other than the cooling and heating fans 52, 53, is provided at an appropriate location therebetween the hydrogen occlusive tank 2, and between the hydrogen occlusive tank 2 and the heating fan 53 is provided a cooling water pipe 6 through which cooling water passes after cooling the fuel cell FC.

A "cooling device" in the present embodiment is principally comprised of the duct 51, the cooling fan 52, and the conduit 54. The cooling device is constructed to cool the hydrogen occlusive tank 2 utilizing liquid air L or air outside the vehicle as appropriate.

Next, operation of the hydrogen storage apparatus M will be described herein.

Figure 3:
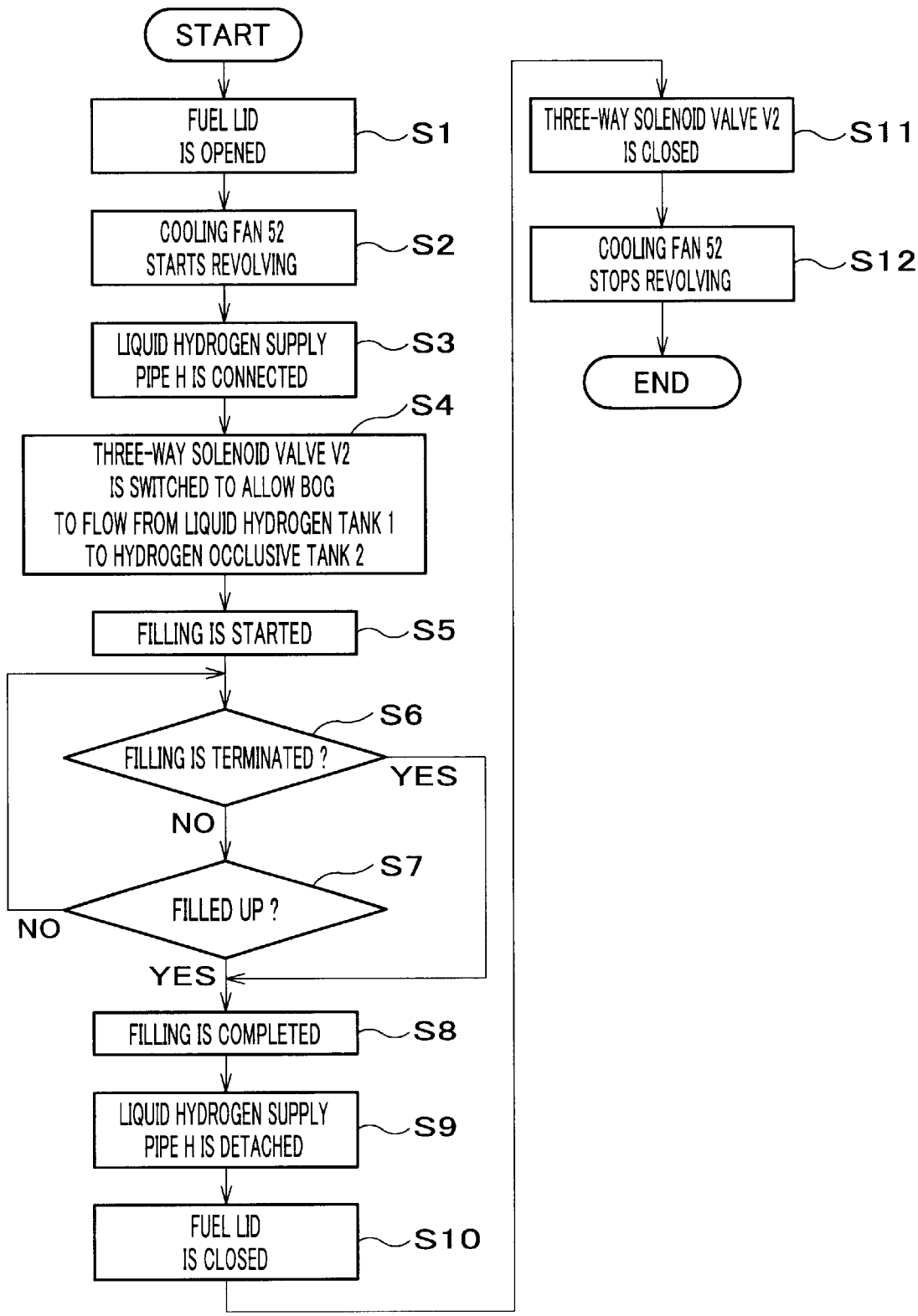
FIG. 3 is a flowchart showing an operation flow of the hydrogen storage apparatus according to the preferred embodiment of the present invention, when liquid hydrogen is being filled.

When liquid hydrogen is filled into the liquid hydrogen tank 1 installed in the fuel cell vehicle A, first, as shown in FIG. 3, a fuel lid covering the vehicular filling port a1 (see FIG. 1) in an openable/closable manner is opened (step S1). A switch (not shown) is then turned on, and the cooling fan 52 starts revolving (step S2). Thereafter, one end of the a liquid hydrogen supply pipe H (see FIG. 1) is connected to the vehicular filling port a1, with the other end thereof connected to a supplier (not shown) for supplying liquid hydrogen (step S3). The three-way solenoid valve V2 is then switched to allow BOG generated in the liquid hydrogen tank 1 to pass through the second passage 42 (step S4).

After the three-way solenoid valve V2 is switched in step S4, the above supplier is actuated to fill liquid hydrogen through the liquid hydrogen supplying pipe H and the hydrogen filling passage 3 into the liquid hydrogen tank 1 (step S5). It is determined whether a user has terminated the filling of hydrogen (step S6). If it is determined that the user has not terminated the filling, the filling is continued, and it is determined using a sensor (not shown) whether the liquid hydrogen tank 1 has been filled up (step S7). If it is then determined that the liquid hydrogen tank 1 has not been filled up, the process goes back to step S6, and it is determined whether the filling has been terminated. If it is determined in step S6 that the user has terminated the filling of hydrogen, then a signal indicating completion of the filling is transmitted to the supplier, and the supplier is stopped (step S8).

After the supplier is stopped in step S8, the liquid hydrogen supplying pipe H is detached from the vehicular filling port a1 (step S9), and the fuel lid is closed (step S10). When the fuel lid is closed in step S10, the three-way solenoid valve V2 is automatically closed (step S11), and the cooling fan 52 also automatically stops revolving (step S12); consequently, the operation of filling liquid hydrogen into the liquid hydrogen tank 1 is completed.

When the filling of liquid hydrogen is started in step S5, the liquid hydrogen passing through the liquid hydrogen pipe 31 in the hydrogen filling passage 3, as shown in FIG. 1, cools the ambient air of the pipe cover 32, and generates liquid air L on the surface of the pipe cover 32. The liquid air L travels along the surface of the pipe cover 32 and goes into the conduit 54, then is led through the conduit 54 into the duct 51. The liquid air L, which has thus been led into the duct 51, is mixed with air blown from outside the vehicle by the cooling fan 52 that has started revolving in step S2, and the resultant low-temperature air is fed toward the hydrogen occlusive tank 2. The low-temperature air cools the inside of the hydrogen occlusive tank 2, and thus lowers pressure of the inside, and when the pressure becomes lower than the pressure in the liquid hydrogen tank 1, the BOG in the liquid hydrogen tank 1 moves into the hydrogen occlusive tank 2 through the second passage 42 that has been switched in steps S4. The BOG that has moved into the hydrogen occlusive tank 2 is occluded into the hydrogen occlusive alloy 21 cooled by the low-temperature air. At this stage, the temperature of the hydrogen occlusive alloy 21 need be made lower than 30° C. as shown in FIG. 2, as the pressure in the hydrogen occlusive tank 2 should be lower than the pressure in the liquid hydrogen tank 1.

Figure 4:
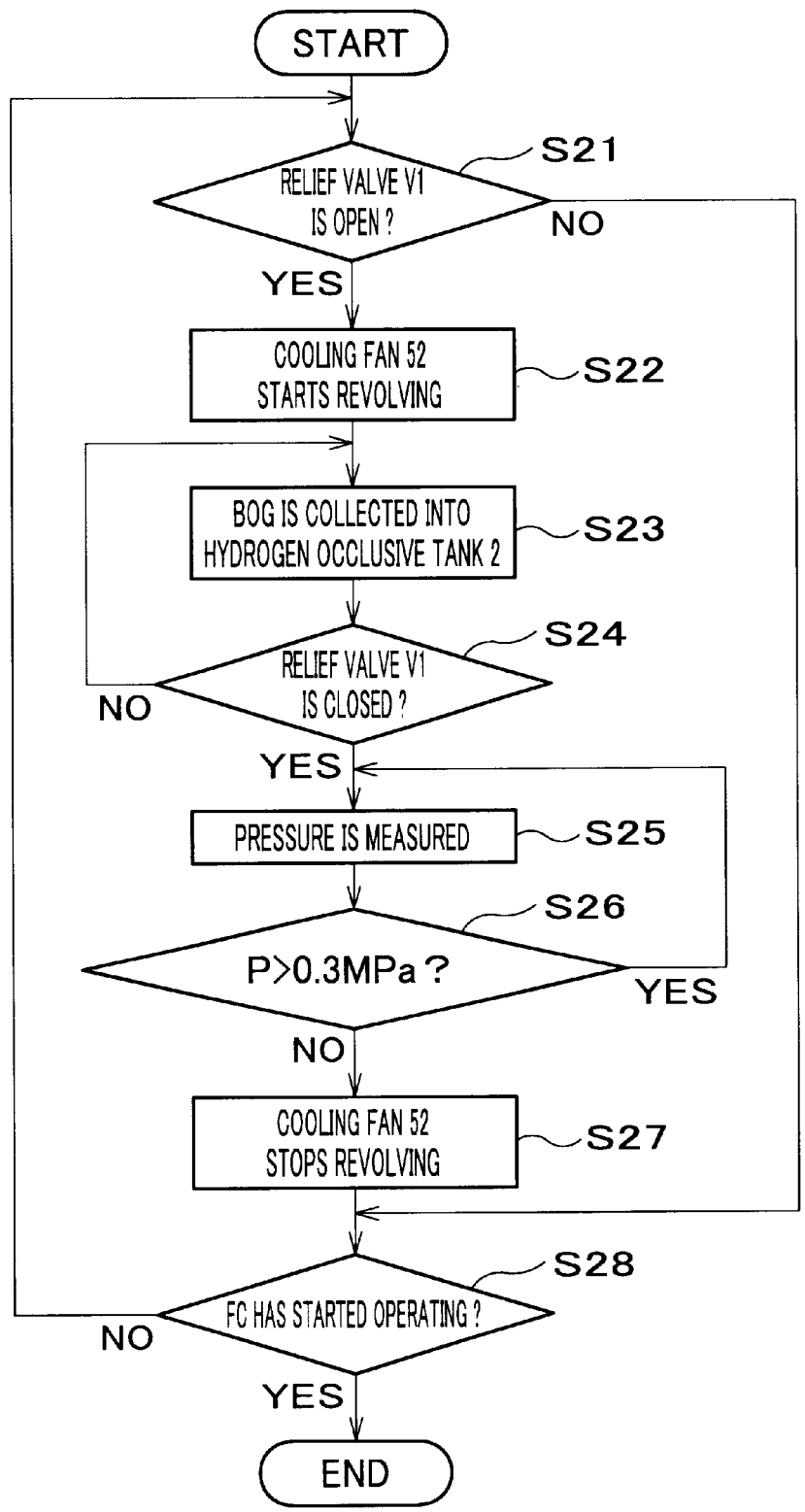
FIG. 4 is a flowchart showing an operation flow of the hydrogen storage apparatus according to the preferred embodiment of the present invention, when a vehicle is stopped.

When the vehicle is stopped for a long time, i.e., all the three solenoid valve arrangements in the three-way solenoid valve V2 are closed, it is determined using a sensor (not shown), as shown in FIG. 4, whether the relief valve V1 is open (step S21). If it is determined that the relief valve V1 is open, a switch (not shown) is turned on and the cooling fan 52 starts revolving (step S22). The BOG in the liquid hydrogen tank 1 is then allowed by the open relief valve V1 to move through the first passage 41 into the hydrogen occlusive tank 2, and air outside the vehicle is blown to the hydrogen occlusive tank 2 by the cooling fan 52 that has started revolving in step S22. Accordingly, the hydrogen occlusive alloy 21 in the hydrogen occlusive tank 2 is cooled by the air blown from outside the vehicle, and is thus enabled to occlude the BOG fed into the hydrogen occlusive tank 2. It is shown in FIG. 2 that the BOG fed into the hydrogen occlusive tank 2, of which the pressure gets approximately 500 kPa or higher as the relief valve V1 is opened, may be occluded in the hydrogen occlusive alloy 21, if the temperature thereof is lowered to approximately 73° C. or below. Therefore, air outside the vehicle alone can sufficiently cool the hydrogen occlusive alloy 21.

The BOG is thus occluded in the cooled hydrogen occlusive alloy 21, and is thereby collected into the hydrogen occlusive tank 2 (step S23). Thereafter, it is determined whether the relief valve V1 is closed (step S24). If it is determined in step S24 that the relief valve V1 is not closed, then the process goes back to step S23, and the BOG is collected again. If it is determined in step S24 that the relief valve V1 is closed, then pressure in the hydrogen occlusive tank 2 is measured using a sensor (not shown) (step S25), and it is determined whether the pressure is higher than 0.3 MPa (step S26). If it is determined in step S26 that the pressure in the hydrogen occlusive tank 2 is higher than 0.3 MPa, then the hydrogen occlusive alloy 21 is kept being cooled to continuously occlude BOG, while the process goes back to step S25 and the pressure in the hydrogen occlusive tank 2 is measured again. If it is in turn determined in step S26 that the pressure in the hydrogen occlusive tank 2 is now 0.3 MPa or lower, then the cooling fan 52 is stopped revolving (step S27).

When the cooling fan 52 is stopped revolving in step S27, or if it is determined in step S21 above that the relief valve V1 is not open, it is determined whether the fuel cell FC has started operating (step S28). If it is determined in step S28 that the fuel cell FC has not started operating, then the process goes back to step S21, and the operations in steps S21 through S28 are performed again. If it is determined in step S28 that the fuel cell FC has started operating, then the operation of collecting BOG performed when the vehicle is stopped as described above is terminated.

Figure 5:
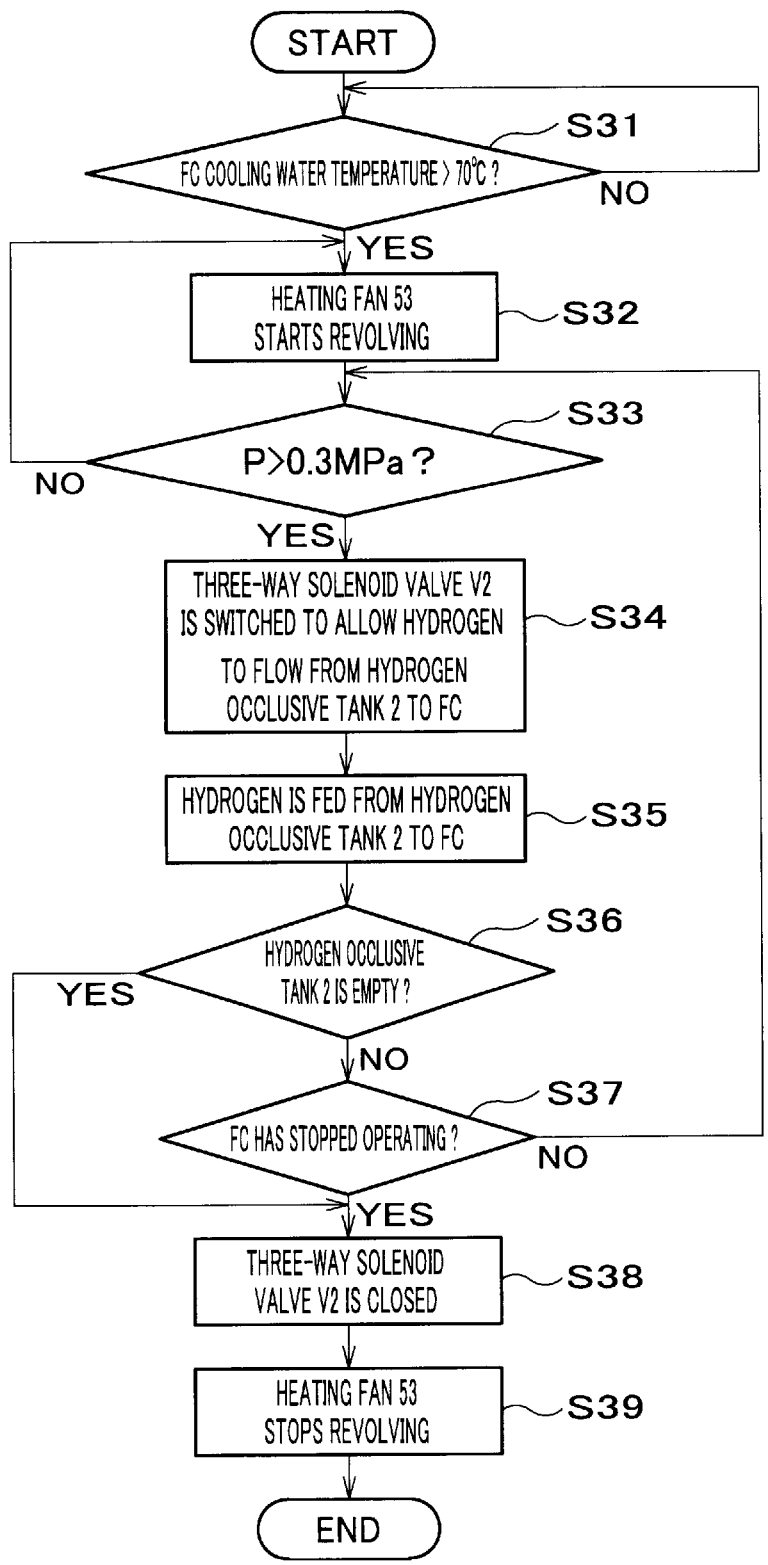
FIG. 5 is a flowchart showing an operation flow of the hydrogen storage apparatus according to the preferred embodiment of the present invention, when a fuel cell is being operated.

When the fuel cell FC is operating, hydrogen collected in the hydrogen occlusive tank 2 is used priorly. As shown in FIG. 5, it is first determined whether temperature of cooling water after cooling the fuel cell FC is higher than approximately 70° C. (step S31). Step S31 is repeated until the temperature of the cooling water measured gets higher than approximately 70° C. In this situation, as shown in FIG. 1, the three-way solenoid valve V2 has only one of the solenoid valve arrangements provided near the hydrogen occlusive tank 2 is kept closed, and the fuel cell FC is driven with hydrogen fed from the liquid hydrogen tank 2. Thereafter, the cooling water absorbs heat generated when the fuel cell FC is driven, and gets a rise in temperature. If it is resultantly determined that the temperature of the cooling water is higher than approximately 70° C., then the heating fan 53 is started revolving (step S32). When the revolving heating fan 53 blows air in from outside the vehicle, the air passes nearby the cooling water pipe 6, absorbs heat from cooling water flowing in the cooling water pipe 6, and goes to the hydrogen occlusive tank 2, to heat the hydrogen occlusive tank 2. In order to utilize hydrogen in the fuel cell FC, the pressure of hydrogen occlusive alloy 21 need be raised to 0.3 MPa or higher, and thus the temperature of the hydrogen occlusive alloy 21 should be raised to approximately 60° C. or higher (see FIG. 2).

When the heating fan 53 revolves in step S32, it is determined whether the pressure in the hydrogen occlusive tank 2 is higher than 0.3 MPa (step S33). If it is determined that the pressure in the hydrogen occlusive tank 2 is 0.3 MPa or lower, then the process goes back to step S32, and steps S32 and S33 are repeated again. If it is determined in step S33 that the pressure in the hydrogen occlusive tank 2 is higher than 0.3 Mpa, then only one of the three solenoid valve arrangements located near the liquid hydrogen tank 1 is switched to be closed (step S34), and hydrogen in the hydrogen occlusive tank 2 is fed to the fuel cell FC (step S35).

While hydrogen is being fed from the hydrogen occlusive tank 2 to the fuel cell FC in step S35, it is determined whether the hydrogen occlusive tank 2 has become empty (step S36). If it is determined in step S36 that the hydrogen occlusive tank 2 has not become empty, then it is determined whether the fuel cell FC has stopped operating (step S37). If it is determined in step S37 that the fuel cell FC has not stopped operating, then the process goes back to step S33, and steps S33 through S36 are performed again. If it is determined in step S36 that the hydrogen occlusive tank 2 has become empty, or it is determined in step S37 that the fuel cell FC has stopped operating, then all the three solenoid valve arrangements of the three-way solenoid valve V2 are closed (step S38). Then, the heating fan 53 stops revolving (step S39). The hydrogen storage apparatus M is controlled by following steps S31 through S39 as described above, and thus hydrogen in the hydrogen occlusive tank 2 is used prior to hydrogen in the liquid hydrogen tank 1.

When it is determined in step S36 that the hydrogen occlusive tank 2 has become empty, the fuel cell FC has not stopped operating yet. Therefore, following steps S38 and S39, only the solenoid valve arrangement located near the hydrogen occlusive tank 2 among three solenoid valve arrangements in the three-way solenoid valve V2 should be switched to be closed again, so as to feed hydrogen from the liquid hydrogen tank 1 to the fuel cell FC.

Following are advantageous effects that may be achieved in the present embodiment as described above:

(1) The hydrogen occlusive tank 2 is cooled and the internal pressure thereof is thus lowered when liquid hydrogen is being filled into the liquid hydrogen tank 1, so that BOG in the liquid hydrogen tank 1 may be absorbed and the internal pressure thereof may be lowered. Consequently, the time required to fill liquid hydrogen into the liquid hydrogen tank 1 may be shortened.

(2) The BOG in the liquid hydrogen tank 1 is occluded in the hydrogen occlusive alloy 21 in the hydrogen occlusive tank 2; therefore, fuel efficiency may be improved.

(3) The hydrogen occlusive alloy 21 in the hydrogen occlusive tank 2 may be swiftly cooled utilizing air liquefied by the liquid hydrogen.

(4) BOG in the hydrogen occlusive tank 2 is used priorly when the vehicle is being driven, and thus the hydrogen occlusive alloy 21 in the hydrogen occlusive tank 2 is ready to occlude BOG generated for example when the vehicle is stopped. Accordingly, the BOG in the liquid hydrogen tank 1 may be collected even when the vehicle is stopped. Consequently, the internal pressure of the liquid hydrogen tank 1 may be kept constant, and the fuel efficiency may be improved.

(5) Air is used as a medium for cooling the hydrogen occlusive tank 2, and thus a structure of the hydrogen storage apparatus M may be simplified.

Although the preferred embodiments of the present invention have been described above, the present invention is not limited to the above-described embodiments, and various modifications and changes may be made in the present invention without departing from the spirit and scope thereof.

For example, BOG, which is filled through the second passage 42 into the hydrogen occlusive tank 2 when the liquid hydrogen is being filled in the present embodiment, may be filled through the relief valve V1 into the hydrogen occlusive tank 2. Accordingly, since the pressure in the hydrogen occlusive tank 2 may be reduced, and a pressure difference between the hydrogen occlusive tank 2 and the liquid hydrogen tank 1 (differential pressure between both sides of the relief valve) may be made large enough to open the relief valve without waiting for increase in the internal pressure of the liquid hydrogen tank 1.

Moreover, although liquid air generated by a much lower temperature of liquid hydrogen is employed as a cooling device in the present embodiment, the present invention may be implemented by any other cooling mechanisms. For example, the hydrogen occlusive tank may be cooled utilizing cooling water. Alternatively, the hydrogen occlusive tank 2 may be cooled utilizing the liquid hydrogen that is being filled, i.e., by directly blowing cold air to the hydrogen filling passage 3 and the liquid hydrogen tank 1.

Further, the dimensions, shapes, materials, etc. of the liquid hydrogen tank 1 and/or the hydrogen occlusive tank 2 may be changed as appropriate. The characteristics of the hydrogen occlusive alloy applicable to the present invention may also be exchangeable as appropriate.

According to one exemplified aspect of the present invention, as set forth in claim 1, hydrogen in the liquid hydrogen tank is flown into the hydrogen occlusive tank, for example, when the liquid hydrogen is being filled, and thus the pressure in the liquid hydrogen tank may be kept below a predetermined level. This facilitates the operation of filling liquid hydrogen into the liquid hydrogen tank, and shortens the filling time.

Further, hydrogen gasified in the liquid hydrogen tank is occluded in the hydrogen occlusive alloy in the hydrogen occlusive tank, thus enhancing the fuel efficiency.

According to another exemplified aspect of the present invention, as set forth in claim 2, which may exert the same advantageous effects as above, the hydrogen occlusive alloy in the hydrogen occlusive tank may be swiftly cooled for example by utilizing air liquefied by the low-temperature liquid hydrogen that is being filled. Consequently, the pressure in the hydrogen occlusive tank may be quickly lowered, and the occlusion of hydrogen in the hydrogen occlusive alloy may be accelerated.

According to yet another exemplified aspect of the present invention, as set forth in claim 3, which may exert the same advantageous effects as above, hydrogen gasified in the liquid hydrogen tank may pass through the bypass into the hydrogen occlusive tank, and thus the pressure in the liquid hydrogen tank does not have to reach a predetermined level required to open the release valve. Therefore, the pressure in the liquid hydrogen tank may be lower than the predetermined level required to open the release valve, which facilitates the operation of filling liquid hydrogen into the liquid hydrogen tank, and shortens the filling time.

According to yet another exemplified aspect of the present invention, as set forth in claim 4, which may exert the same advantageous effects as above, hydrogen in the hydrogen occlusive tank is used priorly when the vehicle is driven by the hydrogen-using device. Therefore, when the vehicle is stopped, the hydrogen occlusive alloy in the hydrogen occlusive tank is ready to occlude hydrogen generated in the liquid hydrogen tank; thus, if the pressure in the liquid hydrogen tank is higher than a predetermined level required to open the release valve, hydrogen in the liquid hydrogen tank may be occluded in the hydrogen occlusive alloy. Consequently, even when the vehicle is stopped, hydrogen gasified in the liquid hydrogen tank may be collected, and thereby the pressure in the liquid hydrogen tank may be kept constant, and the fuel efficiency may be enhanced.

According to the method of filling hydrogen into the hydrogen storage apparatus as yet another exemplified aspect of the present invention, as set forth in claim 5, the pressure in the liquid hydrogen tank is adequately reduced, and thus the time for filling hydrogen can be shortened. Further, no BOG is degassed out, and thus fuel efficiency is improved.

The above method may further include the step of cooling the hydrogen occlusive tank, as in claim 6, and the cooling of the hydrogen occlusive tank contributes to secure reduction of the pressure in the liquid hydrogen tank.

What is claimed is:

1. A hydrogen storage apparatus comprising:
   a liquid hydrogen tank installed in a hydrogen-fueled vehicle driven by a hydrogen-using device;
   a hydrogen filling passage that fills liquid hydrogen into the liquid hydrogen tank;
   a degassing passage provided with a release valve that opens when pressure of hydrogen gasified in the liquid hydrogen tank reaches a predetermined actuating pressure;
   a hydrogen occlusive tank that accommodates a hydrogen occlusive alloy for storing the gasified hydrogen; and
   a cooling device that cools the hydrogen occlusive tank,
   wherein the pressure in the hydrogen occlusive tank when liquid hydrogen is being filled into the liquid hydrogen tank is lowered using the cooling device.

2. A hydrogen storage apparatus according to claim 1, wherein the cooling device cools the hydrogen occlusive tank utilizing the liquid hydrogen that is being filled.

3. A hydrogen storage apparatus according to claim 1, further comprising:
   a bypass that is provided in the degassing passage so as to detour round the release valve; and
   a switching device that alternatively switches a route of the gasified hydrogen between the degassing passage and the bypass,
   wherein the switching device switches the route to allow hydrogen gasified in the liquid hydrogen tank to pass through the bypass when liquid hydrogen is being filled into the liquid hydrogen tank.

4. A hydrogen storage apparatus according to claim 1, wherein the hydrogen occlusive tank is connected to the hydrogen-using device; and
   wherein hydrogen in the hydrogen occlusive tank is used prior to hydrogen in the liquid hydrogen tank when the hydrogen-using device is driven.

5. A method of filling hydrogen into a hydrogen storage apparatus installed in a hydrogen-fueled vehicle driven by a hydrogen-using device, which hydrogen storage apparatus includes a liquid hydrogen tank and a hydrogen occlusive tank, the method comprising the steps of:
   filling liquid hydrogen into the liquid hydrogen tank; and
   enabling the hydrogen occlusive tank to occlude hydrogen gasified in the liquid hydrogen tank, to reduce pressure in the liquid hydrogen tank.

6. A method according to claim 5, further comprising the step of cooling the hydrogen occlusive tank.

* * * * *